United States Patent
Kurz-Hardjosoekatmo et al.

(10) Patent No.: US 10,794,467 B2
(45) Date of Patent: Oct. 6, 2020

(54) PLANETARY GEAR MECHANISM AND AIRCRAFT GAS TURBINE WITH A PLANETARY GEAR MECHANISM

(71) Applicant: Rolls-Royce Deutschland Ltd & Co KG, Blankenfelde-Mahlow (DE)

(72) Inventors: Wolfram Kurz-Hardjosoekatmo, Kleinmachnow (DE); Carsten Wolf, Potsdam (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 16/256,385

(22) Filed: Jan. 24, 2019

(65) Prior Publication Data
US 2019/0226575 A1 Jul. 25, 2019

(30) Foreign Application Priority Data
Jan. 25, 2018 (DE) .................. 10 2018 101 723

(51) Int. Cl.
*F16H 1/28* (2006.01)
*F16H 57/04* (2010.01)
(Continued)

(52) U.S. Cl.
CPC ........... *F16H 57/043* (2013.01); *B60K 6/365* (2013.01); *F16H 1/28* (2013.01); *F16H 57/0423* (2013.01);
(Continued)

(58) Field of Classification Search
CPC ...... F16H 57/043; F16H 57/0423; F16H 1/28; F16H 57/08; F16H 57/0486;
(Continued)

(56) References Cited

U.S. PATENT DOCUMENTS

| 4,378,711 A | 4/1983 | Daniel |
| 6,223,616 B1 | 5/2001 | Sheridan |

(Continued)

FOREIGN PATENT DOCUMENTS

| DE | 102014212487 A1 | 12/2015 |
| EP | 1890054 A1 | 2/2008 |

(Continued)

OTHER PUBLICATIONS

European Search Report dated Aug. 8, 2019 for counterpart European Patent Application No. 19152286.1.
(Continued)

*Primary Examiner* — David J Hlavka
(74) *Attorney, Agent, or Firm* — Shuttleworth & Ingersoll, PLC; Timothy J. Klima (57) ABSTRACT

A planetary gear mechanism has a rotatable planet carrier, a device for conducting oil, and a housing-fixed oil collecting duct. The oil collecting duct surrounds an area of the planet carrier in the circumferential direction. Oil centrifuged off by the planet carrier is collected in the oil collecting duct. In the installation position of the oil collecting duct, the oil is conducted by a gravitational force in the direction of a lower collection area formed with an outlet through which oil can be discharged. A further outlet, through which oil can be conducted, is provided in front of the collection area with respect to the rotational direction of the planet carrier between an upper area of the oil collecting duct, as it appears in the installation position of the oil collecting duct, and the outlet. Also, an aircraft gas turbine with the planetary gear mechanism.

12 Claims, 4 Drawing Sheets

(51) Int. Cl.
*F16H 57/08* (2006.01)
*B60K 6/365* (2007.10)
*F16H 57/02* (2012.01)

(52) U.S. Cl.
CPC ..... *F16H 57/0457* (2013.01); *F16H 57/0479* (2013.01); *F16H 57/0482* (2013.01); *F16H 57/0486* (2013.01); *F16H 57/08* (2013.01); *F16C 2361/61* (2013.01); *F16H 57/082* (2013.01); *F16H 2057/02034* (2013.01); *F16H 2057/02043* (2013.01); *F16H 2057/02073* (2013.01)

(58) Field of Classification Search
CPC ............ F16H 57/0482; F16H 57/0479; F16H 57/0457; F16H 2057/02043; F16H 2057/02073; F16H 2057/02034; F16H 57/082; B60K 6/365; F16C 2361/61
See application file for complete search history.

(56) References Cited

U.S. PATENT DOCUMENTS

| | | | | |
|---|---|---|---|---|
| 8,931,285 | B2* | 1/2015 | McCune | F01D 25/18 |
| | | | | 60/792 |
| 10,119,465 | B2* | 11/2018 | Sheridan | F02C 3/107 |
| 10,281,025 | B2* | 5/2019 | Sheridan | F02C 3/04 |
| 2008/0116010 | A1 | 5/2008 | Portlock et al. | |
| 2009/0069141 | A1* | 3/2009 | Ziemer | F16H 57/08 |
| | | | | 475/269 |
| 2012/0108380 | A1* | 5/2012 | Dinter | F03D 80/70 |
| | | | | 475/159 |
| 2015/0300255 | A1 | 10/2015 | Gallet et al. | |
| 2017/0138460 | A1 | 5/2017 | Beque et al. | |
| 2017/0146112 | A1 | 5/2017 | Anglin et al. | |
| 2017/0284534 | A1 | 10/2017 | Anglin | |
| 2018/0163850 | A1* | 6/2018 | Lao | F02K 3/025 |
| 2019/0085972 | A1* | 3/2019 | Uhkoetter | F01D 25/18 |

FOREIGN PATENT DOCUMENTS

| | | |
|---|---|---|
| EP | 3159498 A2 | 4/2017 |
| WO | 9518319 A1 | 7/1995 |

OTHER PUBLICATIONS

German Search Report dated Sep. 9, 2018 for counterpart German Patent Application No. 10 2018 101 723.5.

* cited by examiner

PLANETARY GEAR MECHANISM AND AIRCRAFT GAS TURBINE WITH A PLANETARY GEAR MECHANISM

This application claims priority to German Patent Application DE102018101723.5 filed Jan. 25, 2018, the entirety of which is incorporated by reference herein.

The present disclosure relates to a planetary gear mechanism which has a rotatable planet carrier and a device for conducting oil, having a housing-fixed oil collecting duct, of the type defined more specifically disclosed herein. The present disclosure also relates to an aircraft gas turbine with such a planetary gear mechanism.

During the operation of aircraft gas turbines, oil progressively collects in the area of cavities through which a volume of oil and air is made to flow. Such cavities are, for example, bearing chambers or interior spaces in gearboxes. These accumulations of oil in cavities are also referred to as oil gulp and must be taken into account when designing a volume of an oil tank of an aircraft gas turbine. Oil gulp is a volume of oil surplus to requirements for cooling and lubrication in the operation of an aircraft gas turbine. What is more, oil gulp increases the total amount of oil to be initially provided in the oil tank of an aircraft gas turbine, necessitating a large tank volume. Both cause an aircraft gas turbine to be of a great weight, which however is undesired.

With an oil feed of an appropriate design, the oil enters the cavities with a tangential momentum on a defined radius and in each case distributed uniformly over the circumference of the cavity. This has the effect that, when it makes impact with the housing wall bounding the cavity, the oil flow respectively introduced flows tangentially along the bounding wall as a result of the initial momentum. There is the possibility that the oil flow on the housing wall is further accelerated by an air flow occurring in the cavity. The oil leaves the aforementioned cavities via an outlet. In the installation position of the cavity, the outlet of such a cavity is often at the lowest point of the cavity. The oil is then discharged from the cavities via the outlets by the force of the weight acting on it. Since the momentum of the oil that occurs in each case when it enters the cavity and the air flow in the cavity possibly counteract the gravitational force acting on the oil, the undesired accumulation of oil in the cavity described more specifically above is encouraged.

In order to improve the flow of oil from the cavities and reduce oil gulp, it is attempted to improve or increase the volume flow rate of the oil from the cavities through the outlets, for example by producing a suction effect or by appropriate shaping of the outlet. Current measures for reducing the oil gulp in cavities are concentrated especially on modifications of the outlet from the cavities. However, in particular in cases of greater volumes of oil to be conducted through the cavities, this procedure is disadvantageously not conducive to achieving the objective of keeping oil gulp down to the desired extent.

EP 1 890 054 A1 discloses a turbine engine with a planetary gear mechanism which comprises a two-piece ring gear. The ring gear is surrounded by an annular channel, into which oil that is fed to the planetary gear mechanism is introduced during operation.

The present disclosure is based on the object of providing a planetary gear mechanism which has a rotatable planet carrier and a device for conducting oil, having a housing-fixed oil collecting duct, by means of which oil gulp can be reduced in comparison with solutions known from the prior art. The present disclosure is also based on the object of providing an aircraft gas turbine that is low in cost and characterized by a low component weight.

These objects are achieved by a planetary gear mechanism with the features of disclosed herein.

According to a first aspect, the planetary gear mechanism has a rotatable planet carrier and a device for conducting oil with at least one housing-fixed oil collecting duct. The oil collecting duct surrounds at least one area of the rotatable planet carrier in the circumferential direction. Furthermore, oil that is centrifuged off by the planet carrier during its rotation can be collected in the oil collecting duct.

In the installation position of the oil collecting duct, the oil can be conducted by the gravitational force acting on the oil in the oil collecting duct in the direction of a lower collection area. The collection area is formed with an outlet through which oil can be discharged from the collection area of the oil collecting duct. To avoid undesirably large accumulations of oil in the area of the oil collecting duct, at least one further outlet, through which oil can be conducted out of the oil collecting duct, is additionally provided in front of the collection area with respect to the rotational direction of the planet carrier between an upper area of the oil collecting duct, as it appears in the installation position of the oil collecting duct, and the outlet of the collection area.

By means of the further outlet, it is possible in a structurally simple way that oil flowing away in the direction of the collection area in the oil collecting duct can be removed from the oil collecting duct already before reaching the collection area, and consequently can be discharged from the cavity bounded between the oil collecting duct and the rotating planet carrier and can for example be fed to an oil circuit of an aircraft gas turbine. In this way, an oil gulp in the area of the cavity between the oil collecting duct and the rotatable planet carrier is reduced with little expenditure in comparison with solutions known per se.

The present disclosure is based on the knowledge that the further outlet of the oil collecting duct allows oil that has collected in the area of the oil collecting duct to be removed from a cavity over a short flow path much more directly, and consequently within shorter operating times, in comparison with known solutions. This minimizes undesired flow losses that are caused by lines or other means. This ultimately leads in an easy way to the desired limitation of accumulations of oil or the oil gulp in cavities. In addition, the arrangement of the device according to the present disclosure also has the effect of minimizing in an easy way an undesired interaction with other oil flows of other oil consumers, which are conducted outside the oil collecting duct.

In the case of a further advantageous embodiment of the planetary gear mechanism according to the present disclosure, a radial distance between the outer side of the rotatable planet carrier facing the oil collecting duct and the oil collecting duct is designed such that, when the planet carrier is rotating, an air flow that conducts the oil in the oil collecting duct in the rotational direction of the planet carrier occurs in the circumferential area that is bounded by the oil collecting duct and the planet carrier. It is thereby once again ensured in an easy way that the oil is discharged from the oil collecting duct through the further outlet within short operating times, and undesirably large accumulations of oil are avoided.

In addition to this or as an alternative to this, a radial distance between the outer side of the planet carrier facing the oil collecting duct and the oil collecting duct may be designed such that, when the planet carrier is rotating, the oil has in the circumferential area that is bounded by the oil collecting duct and the planet carrier a momentum that conducts the oil in the oil collecting duct in the rotational direction of the planet carrier. Consequently, even when there is a negative pressure in the area between the oil collecting duct and the outer side of the planet carrier, it is ensured that the oil is discharged again from the area between the oil collecting duct and the planet carrier within short operating times.

In the case of an advantageous embodiment of the planetary gear mechanism according to the present disclosure, the further outlet has an inlet opening, which is provided on the inner side of the oil collecting duct facing the rotatable planet carrier, an outlet opening, which is provided on the outer side of the oil collecting duct facing away from the rotatable planet carrier, and a duct connecting the inlet opening and the outlet opening. It is additionally provided that a flow rate of the oil as it flows through the inlet opening, the duct and the outlet opening remains at least approximately the same. It is thereby ensured that the momentum of the oil at the outlet from the oil collecting duct is substantially maintained and an undesired accumulation of oil or an undesirably great oil gulp is avoided with little expenditure.

In the case of further structurally simple embodiments of the planetary gear mechanism according to the present disclosure, the further outlet is designed as a bore running substantially tangentially through the annular oil collecting duct or as a slot running substantially tangentially through the annular oil collecting duct.

In the case of a further advantageous embodiment of the planetary gear mechanism according to the present disclosure, an oil gulp can be limited to the desired extent by providing that an outlet area of the further outlet comprising an area of the duct and the outlet opening for the oil to be removed from the oil collecting duct is designed in such a way that the oil can be conducted out of the further outlet in the direction of an oil collection area provided outside the oil collecting duct. In the installation position of the oil collecting duct, the oil collection area is arranged underneath the oil collecting duct. Furthermore, oil leaving the oil collecting duct via the outlet can also be introduced into the oil collection area.

In the case of further advantageous embodiments of the planetary gear mechanism according to the present disclosure, at least one further oil collecting duct is provided, surrounding a further area of the rotatable planet carrier and/or an area of a further rotatable structural component in the circumferential direction. Then, undesirably large accumulations of oil can be avoided in an easy way, including when there are only limited available installation spaces within which an oil collecting duct can be respectively arranged.

If the oil collecting duct is arranged between the rotatable planet carrier and a gearbox housing in the radial direction of the planet carrier and is connected for conjoint rotation to the gearbox housing, the planetary gear mechanism according to the present disclosure once again has a structurally simple and low-cost construction, and undesirably large accumulations of oil in the area of the planetary gear mechanism are avoided with little expenditure.

In the case of a further advantageous embodiment of the planetary gear mechanism according to the present disclosure, undesirably large accumulations of oil are avoided by the value of a radial distance between the oil collecting duct and the rotatable planet carrier in each case being less than or equal to the value of half a radial distance between the rotatable planet carrier and the gearbox housing.

The aircraft gas turbine according to the present disclosure is formed with a planetary gear mechanism described more specifically above, and therefore can be designed favorably in terms of cost and installation space, since a small oil gulp means that only a small oil volume has to be provided in the aircraft gas turbine and, for example, an oil tank of the aircraft gas turbine can be designed with a smaller volume in comparison with solutions known from practice.

Both the features indicated herein and in the following exemplary embodiments of the subject matter according to the present disclosure are suitable for further developing the subject matter, respectively on their own or in any combination.

Further advantages and advantageous embodiments of the planetary gear mechanism according to the present disclosure will emerge from the disclosed herein and the exemplary embodiments disclosed in principle below with reference to the drawings.

Figure 1:
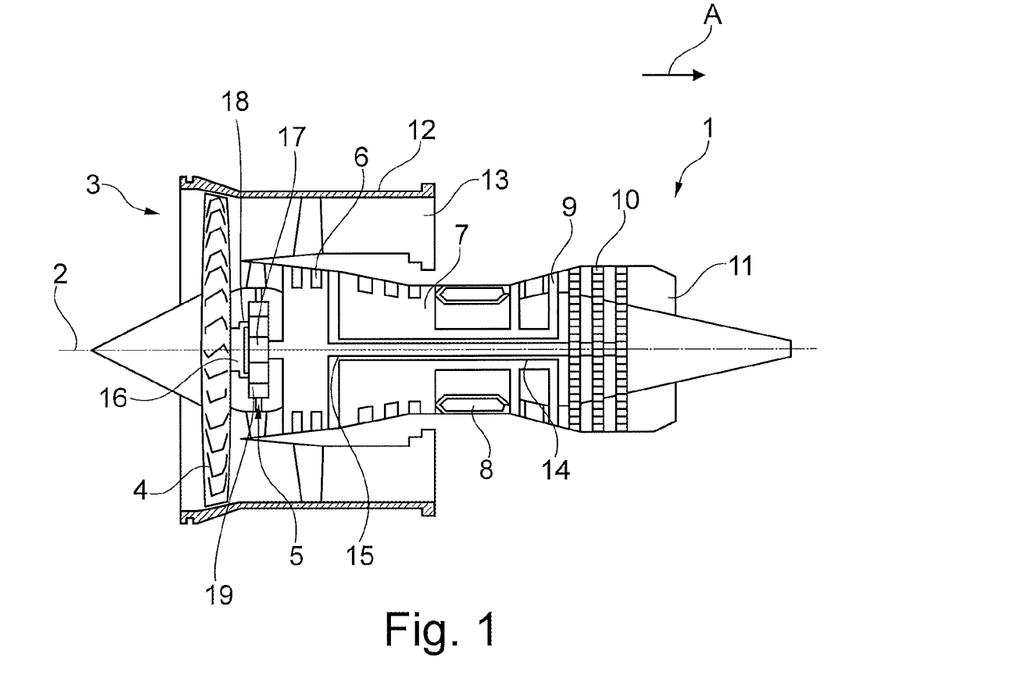
FIG. 1 shows a simplified sectional representation of an aircraft gas turbine, having a fan and a low-pressure turbine, wherein the fan is connected to the low-pressure turbine by means of a planetary gear mechanism.

FIG. 1 shows a flow machine designed as a gas turbine 1 of an aircraft, having a planetary gear mechanism 5. The aircraft gas turbine 1 is a turbomachine, with which the planetary gear mechanism 5 can be advantageously combined. It will become clear from the following that the planetary gear mechanism 5 can also be used in the case of turbomachines of other designs, such as a propeller turbine jet engine or turboprop.

The aircraft gas turbine 1 has a main axis of rotation 2. In the axial flow direction A, the aircraft gas turbine 1 furthermore comprises an air inlet 3, a fan 4, the planetary gear mechanism 5, a low-pressure compressor 6, a high-pressure compressor 7, a combustion device 8, a high-pressure turbine 9, a low-pressure turbine 10 and an outlet nozzle 11. A nacelle 12 surrounds the aircraft gas turbine 1 and delimits the air inlet 3.

The aircraft gas turbine 1 operates in a conventional manner, wherein air entering the air inlet 3 is accelerated by the fan 4 in order to produce two air flows. A first air flow flows into the intermediate-pressure compressor 6, and a second air flow is passed through a secondary flow duct 13 or bypass duct in order to provide thrust. The low-pressure compressor 6 compresses the air flow fed to it before the air is compressed further in the area of the high-pressure compressor 7.

The compressed air flowing out of the high-pressure compressor 7 is introduced into the combustion device 8, where mixing with fuel takes place and the fuel-air mixture is burnt. The hot combustion products which are formed expand and, in the process, drive the high-pressure turbine 9 and the low-pressure turbine 10 before being discharged via the outlet nozzle 11 in order to provide additional thrust. By means of a high-pressure shaft 14 and a low-pressure shaft 15, respectively, the high-pressure turbine 9 and the low-pressure turbine 10 drive the high-pressure compressor 7 and the low-pressure compressor 6, respectively. The low-pressure shaft 15 coupling the low-pressure turbine 10 to the low-pressure compressor 6 is coupled to the fan 4 by the planetary gear mechanism 5 representing a reduction gear. A drive torque applied to the planetary gear mechanism 5 via the low-pressure shaft 15 is raised in accordance with the stationary gear ratio of the planetary gear mechanism 5 and is fed to a fan shaft 16. When the fan 4 is driven by the low-pressure turbine 10, the speed of the low-pressure shaft 15 is reduced in accordance with the transmission ratio of the planetary gear mechanism 5, and the fan shaft 16 and the fan 4 are driven at this reduced speed and with a torque higher than the torque applied to the low-pressure shaft 15.

In the embodiment of the planetary gear mechanism 5 shown in FIG. 1, a sun gear 17 of the planetary gear mechanism 5 is connected for conjoint rotation to the low-pressure shaft 15, and a planet carrier 18 of the planetary gear mechanism 5 is connected for conjoint rotation to the fan shaft 16. A ring gear 19 of the planetary gear mechanism 5 is mounted in a manner fixed relative to the housing. Planet gears 40 mounted rotatably on the planet carrier 18 mesh both with the sun gear 17 and with the ring gear 19. The planetary gear mechanism 5 is thus designed as an epicyclic gear mechanism. Notwithstanding this, the planetary gear mechanism 5 can also be designed as some other kind of planetary gear mechanism.

Figure 2:
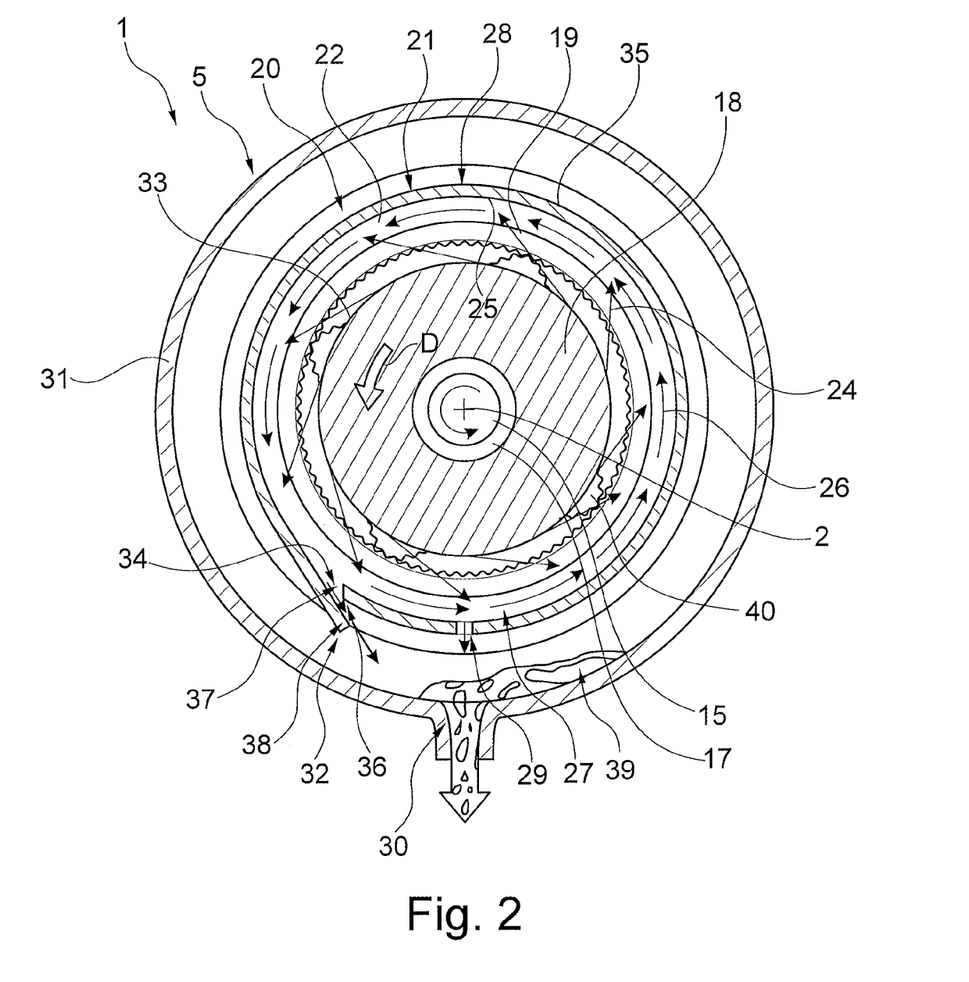
FIG. 2 shows a schematized individual cross-sectional view of the planetary gear mechanism according to FIG. 1 along a sectional plane II-II indicated more specifically in FIG. 3.
Figure 3:
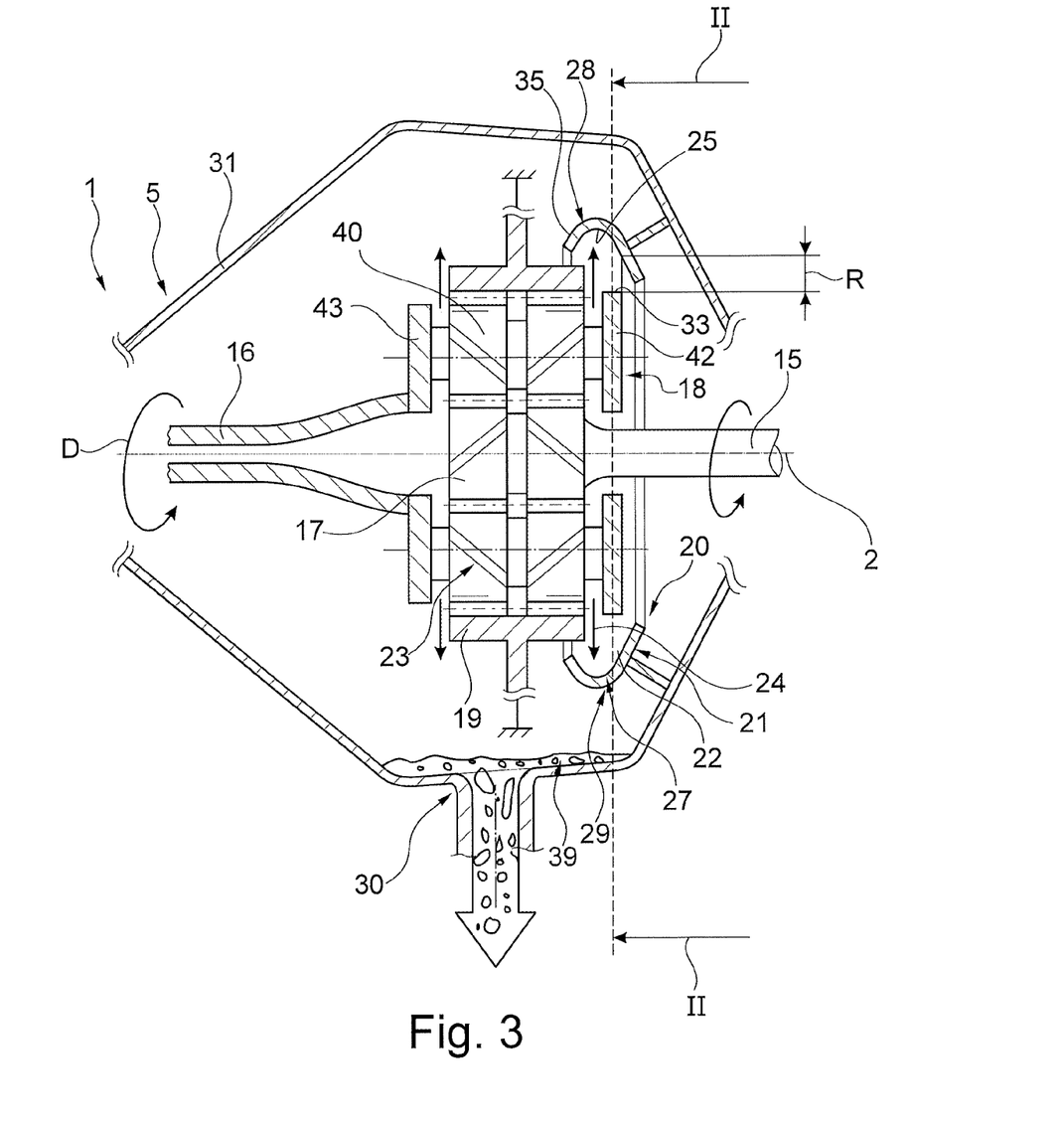
FIG. 3 shows a schematized individual longitudinal sectional view of the planetary gear mechanism according to FIG. 1.
Figure 4:
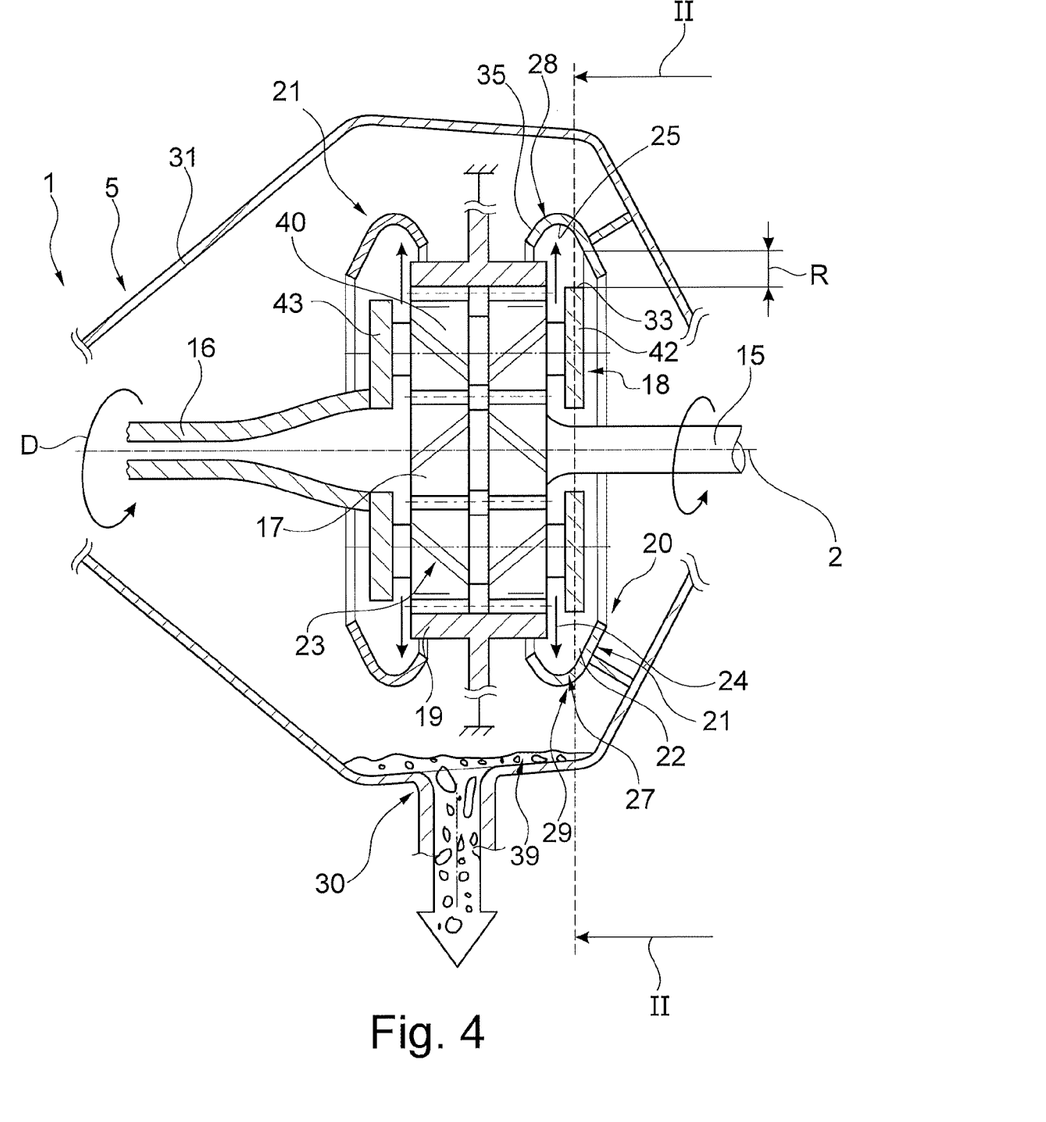
FIG. 4 shows a representation corresponding to FIG. 3 of a further embodiment of the planetary gear mechanism according to FIG. 1.

FIG. 2 shows an individual cross-sectional view of the planetary gear mechanism 5 according to FIG. 1 along a sectional plane II-II indicated more specifically in FIG. 3 or FIG. 4. The planetary gear mechanism 5 is additionally formed with a device 20 for conducting oil, having a housing-fixed oil collecting duct 21. The oil collecting duct 21 surrounds in the circumferential direction an area 42 of the planet carrier 18 designed as a rotatable structural component of the planetary gear mechanism 5, whereby oil that is centrifuged off by the planet carrier 18 during its rotation can be collected in the oil collecting duct 21. For this, the oil collecting duct 21 bounds an annular groove 22, which is facing the planet carrier 18 and is open with respect to it and which is represented more specifically in FIG. 3, which is an individual longitudinal sectional view of the planetary gear mechanism 5.

During the operation of the aircraft gas turbine 1, and consequently when the planet carrier 18 is rotating, oil for cooling and lubrication is fed to the planetary gear mechanism 5 via an oil feeding area 23. On account of the rotation of the planet carrier 18, the oil fed to it is centrifuged off by the planet carrier 18 in the directions indicated by the arrows 24 that are represented more specifically in FIG. 2, initially substantially tangentially, and impinges on the inner side 25 of the oil collecting duct 21 that is bounding the annular groove 22.

The momentum imparted to the oil by the planet carrier 18 has the effect that the oil flows on the inner side 25 of the oil collecting duct 21, in a way corresponding to the arrows 26 likewise shown more specifically in FIG. 2, in the circumferential direction of the oil collecting duct 21 and ultimately in the direction of a lower collection area 27 of the oil collecting duct 21, as it appears in the installation position of the oil collecting duct 21. Furthermore, from when it reaches an upper area 28, as it appears in the installation position of the oil collecting duct 21, the flow of the oil in the direction of the arrows 26 is also brought into the direction of the collection area 27 as a result of the gravitational force acting on the oil. In this case, the upper area 28 and the collection area 27 of the oil collecting duct 21 are in the position represented in FIG. 2 and FIG. 3 during a horizontal flight of an aircraft fitted with the aircraft gas turbine 1.

In the present case, the collection area 27 is formed at the lowest point of the collection area 27 with an outlet 29, by which oil can be discharged from the oil collecting duct 21 or the annular groove 22 radially outward or downward in the direction of a drain 30 of the gearbox 5. In this case, the drain 30 corresponds to an opening in a gearbox housing 31 of the planetary gear mechanism 5, which is connected to an oil circuit not represented any more specifically of the aircraft gas turbine 1. Oil can be applied to other consumers or structural components or areas of the aircraft gas turbine 1 by means of the oil circuit of the aircraft gas turbine 1. Examples of such areas are bearing chambers, an auxiliary equipment gearbox and the like.

In addition, the device 20 is formed with a further outlet 32, through which oil can be conducted out of the oil collecting duct 21 in the direction of the drain 30, in front of the collection area 27 with respect to a rotational direction D of the planet carrier 18 between the upper area 28 of the oil collecting duct 21 and the outlet 29 of the collection area 27.

A radial distance R between the outer side 33 of the planet carrier 18 facing the oil collecting duct 21 and the inner side 25 of the oil collecting duct 21 is designed such that, when the planet carrier 18 is rotating, an air flow that conducts the oil in the oil collecting duct 21 in the rotational direction D of the planet carrier 18 occurs in the circumferential area that is bounded by the oil collecting duct 21 and the planet carrier 18. This achieves the effect that the oil in the oil collecting duct 21 has a momentum conducting the oil in the rotational direction D of the planet carrier 18.

The further outlet 32 comprises an inlet opening 34, which is provided on the inner side 25 of the oil collecting duct 21 facing the planet carrier 18, an outlet opening 36, which is provided on the outer side 35 of the oil collecting duct 21 facing away from the planet carrier 18, and a duct 37 connecting the inlet opening 34 and the outlet opening 36. It is provided in this case that the inlet opening 34, the duct 37 and the outlet opening 36 are designed such that a flow rate of the oil as it flows through the inlet opening 34, the duct 37 and the outlet opening 36 remains at least approximately the same, and consequently a desired rapid discharge of the oil from the planetary gear mechanism 5 in the direction of the oil circuit of the aircraft gas turbine 1 is achieved.

Furthermore, an outlet area 38 of the further outlet 32 comprising an area of the duct 37 and the outlet opening 36 for the oil to be removed from the oil collecting duct 21 is designed in such a way that the oil can be conducted out of the further outlet 32 in the direction of an oil collection area 39, which is provided outside the oil collecting duct 21 and connected via the drain 30 to the oil circuit of the aircraft gas turbine 1. For this, the course of the area of the duct 37 facing the outlet opening 36 and the shape of the outlet opening 36 are formed such that, when it leaves the outlet area 38, the oil is conducted directly in the direction of the oil collection area 39. In the installation position of the oil collecting duct 21, the oil collection area 39 is in this case arranged underneath the oil collecting duct 21. Furthermore, oil leaving the oil collecting duct 21 via the outlet 29 of the collection area 27 can be introduced into the oil collection area 39.

Generally, in the configuration and arrangement of the device 20 around the planet carrier 18, it must be ensured that the oil collecting duct 21 should be arranged as close as possible to, or with as little radial distance as possible from, the area of the planet carrier 18. As a result, the oil centrifuged off by the planet carrier 18 is introduced with the greatest possible momentum into the oil collecting duct 21 and subsequently fed in the direction of the further outlet 29 in the oil collecting duct 21. In addition, as little oil gulp as possible accumulates in the interior of the gearbox housing 31 also because the oil centrifuged off by the planet carrier 18 does not have to be conducted over the entire circumference of the oil collecting duct 21 to the outlet 29 before it can be discharged from the oil collecting duct 21 in the direction of the drain 30 from the oil collecting duct 21.

The arrangement of the device 20 also has the effect of preventing that the oil centrifuged off by the planet carrier 18 impinges directly on the inner side of the gearbox housing 31 and, in comparison with the arrangement of the device 20, much longer operating times elapse before the oil is discharged from the inner side of the gearbox housing 31 via the drain 30 out of the planetary gear mechanism 5 in the direction of the oil circuit of the aircraft gas turbine 1.

Generally, there is the possibility of arranging the device in the area of gearboxes, bearing chambers and other cavities to which a mixture of air and oil is applied, within which a rotating oil inlet is provided.

Furthermore, there is also the possibility of connecting the further outlet 32 directly to the drain 30, in order to reduce to a minimum the oil gulp accumulating in the planetary gear mechanism 5 during operation.

In addition, the advantages of the device 20 are also obtained during in-flight operating states during which the aircraft gas turbine 1 is in an inclined position or in an at least approximately weightless in-flight operating state. Furthermore, the functional principle of the device 20 described above also applies under negative G forces occurring in flight and acting on the oil, as is the case for example during a sudden drop in flying altitude.

FIG. 4 shows a representation corresponding to FIG. 3 of a further exemplary embodiment of the planetary gear mechanism 5, which is formed with a device 20 which comprises all of the features of the device 20 of the planetary gear mechanism 5 according to FIG. 2 and FIG. 3 and is additionally fitted with a further oil collecting duct 41. The further oil collecting duct 41 is designed as a mirror image of the oil collecting duct 21 and otherwise has the same construction and the same functional or operational principle as the oil collecting duct 21. Furthermore, the oil collecting duct 41 is once again connected for conjoint rotation to the gearbox housing 31 and surrounds a further area 43 of the planet carrier 18 in the circumferential direction. Consequently, once again oil that is centrifuged off by the planet carrier 18 during its rotation can be collected in the further oil collecting duct 41. From the further oil collecting duct 41, the collected oil can be conducted in the direction of the drain 30 to the same extent as via the oil collecting duct 21 in the way described in relation to FIG. 2 and FIG. 3, and can be discharged from the gearbox housing 31 within desired short operating times.

LIST OF DESIGNATIONS 1 aircraft gas turbine
2 main axis of rotation
3 air inlet
4 fan
5 planetary gear mechanism
6 low-pressure compressor
7 high-pressure compressor
8 combustion device
9 high-pressure turbine
10 low-pressure turbine
11 outflow nozzle
12 nacelle
13 secondary flow duct
14 high-pressure shaft
15 low-pressure shaft
16 fan shaft
17 sun gear
18 planet carrier
19 ring gear
20 device
21 oil collecting duct
22 annular groove of the oil collecting duct
23 oil feeding area
24 direction of the centrifuged-off oil
25 inner side of the oil collecting duct
26 direction of flow of the oil in the oil collecting duct
27 collection area
28 upper area of the oil collecting duct
29 outlet
30 drain
31 gearbox housing
32 further outlet
33 outer side of the planet carrier
34 inlet opening
35 outer side of the oil collecting duct
36 outlet opening
37 duct
38 outlet area
39 oil collection area
40 planet gear
41 further oil collecting duct
42 area of the planet carrier
43 further area of the planet carrier
D rotational direction of the planet carrier
R radial distance

The invention claimed is:
1. A planetary gear mechanism inside a gearbox housing, comprising:
a rotatable planet carrier including an outer surface;
a device for conducting oil, including:
an oil collecting duct fixed at the gearbox housing, wherein the oil collecting duct at least partially surrounds the rotatable planet carrier in a circumferential direction with respect to an axis at rotation of the rotatable planet carrier, wherein oil that is centrifuged off by the rotatable planet carrier during a rotation of the rotatable planet carrier is collected, and wherein the oil collecting duct further comprises:
an upper area and a lower collection area, wherein oil is conducted by a gravitational force acting in the oil collecting duct in a direction of the lower collection area;
a first outlet located at the lower collection area, wherein through the first outlet oil is discharged from the lower collection area; and
at least one second outlet through which oil is conducted out of the oil collecting duct, wherein the at least one second outlet is located in front of the first outlet with respect to a rotational direction of the rotatable planet carrier, and wherein the at least one second outlet is located between the upper area of the oil collecting duct and the first outlet;

an inner surface, wherein the outer surface of the rotatable planet carrier faces the oil collecting duct, and further comprising a radial distance between the outer surface at the rotatable planet carrier and the inner surface of the oil collecting duct such that, when the rotatable planet carrier is rotating, the oil has in a circumferential area that is bounded by the oil collecting duct and the rotatable planet carrier, a momentum that conducts the oil in the oil collecting duct in the rotational direction at the rotatable planet carrier.

2. The planetary gear mechanism according to claim 1, wherein the oil collecting duct includes an inner surface, wherein the rotatable planet carrier includes an outer side facing the oil collecting duct, and further comprising a radial distance between the outer side of the rotatable planet carrier and the inner surface of the oil collecting duct such that, when the rotatable planet carrier is rotating, an air flow conducts oil in the oil collecting duct in the rotational direction of the rotatable planet carrier in a circumferential area that is bounded by the oil collecting duct and the rotatable planet carrier.

3. The planetary gear mechanism according to claim 1, wherein, the at least one second outlet includes:
an inlet opening, which is located on an inner side of the oil collecting duct facing the rotatable planet carrier;
an outlet opening, which is located on an outer side of the oil collecting duct facing away from the rotatable planet carrier; and
a duct connecting the inlet opening and the outlet opening, wherein a flow rate of oil as the oil flows through the inlet opening, the duct and the outlet opening remains at least approximately the same.

4. The planetary gear mechanism according to claim 1, wherein the oil collectin duct is annular and the at least one second outlet is a bore running tangentially through the oil collecting duct.

5. The planetary gear mechanism according to claim 1, wherein the oil collecting duct is annular and the at least one second outlet is a slot running tangentially through the oil collecting duct.

6. The planetary gear mechanism according to claim 3, further comprising a second outlet area of the at least one second outlet including an area of the duct and the outlet opening for oil to be removed from the oil collecting duct, wherein the second outlet area is located outside the oil collecting duct and arranged underneath the oil collecting duct to conduct oil out of the at least one second outlet in a direction of the oil collection area, and into which oil leaving the oil collecting duct via the at least one second outlet is introduced.

7. The planetary gear mechanism according to claim 1, wherein the device for conducting oil includes a second oil collecting duct, and wherein the second oil collecting duct at least partially surrounds at least one chosen from an area of the rotatable planet carrier and an area of a further rotatable structural component in the circumferential direction.

8. The planetary gear mechanism according to claim 1, wherein, the oil collecting duct is arranged between the rotatable planet carrier and the gearbox housing in a radial direction of the rotatable planet carrier with respect to the axis of rotation and is connected for conjoint rotation to the gearbox housing.

9. The planetary gear mechanism according to claim 8, wherein a radial distance between the oil collecting duct and the rotatable planet carrier is less than or equal to half a radial distance between the rotatable planet carrier and the gearbox housing.

10. An aircraft gas turbine with the planetary gear mechanism according to claim 1.

11. A planetary gear mechanism inside a gearbox housing, comprising:
a rotatable planet carrier; and
a device for conducting oil, including:
an oil collecting duct fixed at the gearbox housing, wherein the oil collecting duct at least partially surrounds the rotatable planet carrier in a circumferential direction with respect to an axis of rotation of the rotatable planet carrier, wherein oil that is centrifuged off by the rotatable planet carrier during a rotation of the rotatable planet carrier is collected, and wherein the oil collecting duct further comprises:
an upper area and a lower collection area, wherein oil is conducted by a gravitational force acting in the oil collecting duct in a direction of the lower collection area;
a first outlet located at the lower collection area, wherein through the first outlet oil is discharged from the lower collection area; and
at least one second outlet through which oil is conducted out of the oil collecting duct, wherein the at least one second outlet is located in front of the first outlet with respect to a rotational direction of the rotatable planet carrier, and wherein the at least one second outlet is located between the upper area of the oil collecting duct and the first outlet, and wherein, the at least one second outlet includes:
an inlet opening located on an inner side of the oil collecting duct facing the rotatable planet carrier;
an outlet opening located on an outer side of the oil collecting duct facing away from the rotatable planet carrier; and
a duct connecting the inlet opening and the outlet opening, wherein a flow rate of oil as the oil flows through the inlet opening, the duct, and the outlet opening remains at least approximately the same.

12. A planetary gear mechanism inside a gearbox housing, comprising:
a rotatable planet carrier; and
a device for conducting oil, including:
an oil collecting duct fixed at the gearbox housing, wherein the oil collecting duct at least partially surrounds the rotatable planet carrier in a circumferential direction with respect to an axis of rotation of the rotatable planet carrier, wherein oil that is centrifuged off by the rotatable planet carrier during a rotation of the rotatable planet carrier is collected, and wherein the oil collecting duct further comprises:
an upper area and a lower collection area, wherein oil is conducted by a gravitational force acting in the oil collecting duct in a direction of the lower collection area;
a first outlet located at the lower collection area, wherein through the first outlet oil is discharged from the lower collection area; and at least one second outlet through which oil is conducted out of the oil collecting duct, wherein the at least one second outlet is located in front of the first outlet with respect to a rotational direction of the rotatable planet carrier, and wherein the at least one second outlet is located between the upper area of the oil collecting duct and the first outlet; and wherein the oil collecting duct is annular and the at least one second outlet is chosen from a group including a bore running tangentially through the oil collecting duct and a slot running tangentially through the oil collecting duct.

\* \* \* \* \*